United States Patent [19]

Kakehi et al.

[11] 4,404,056
[45] Sep. 13, 1983

[54] METHOD OF JOINING WATERPROOF VULCANIZED SYNTHETIC RUBBER SHEETS

[75] Inventors: Masanori Kakehi, Kobe; Yoshitaka Higashida, Miki; Kenzo Iwamoto; Hikaru Kano, both of Kobe, all of Japan

[73] Assignee: Mitsuboshi Belting Ltd., Kobe, Japan

[21] Appl. No.: 238,282

[22] Filed: Feb. 25, 1981

[51] Int. Cl.³ .......................... B29C 19/00; C09J 7/00
[52] U.S. Cl. ............................ 156/244.11; 156/306.9; 156/313; 156/334
[58] Field of Search ................... 156/307.3, 308.4, 313, 156/331.1, 71, 66, 202, 216, 244.24, 306.9, 334, 244.11, 157

[56] References Cited

U.S. PATENT DOCUMENTS 2,936,261  5/1960  Cole .................................. 156/308.4
3,976,530  8/1976  Callan ............................. 156/244.11
4,152,473  5/1979  Layman ................................. 156/71

Primary Examiner—William A. Powell
Assistant Examiner—Louis Falasco
Attorney, Agent, or Firm—Sughrue, Mion, Zinn, Macpeak and Seas

[57] ABSTRACT

A method for joining waterproof vulcanized synthetic rubber sheets is described wherein a cold-vulcanizable adhesive tape having Mooney viscosity [$ML_{1+5}$ (100° C.)] of from 5 to 25 and an autoadhesion property, and which contains a rubbery polymer comprising (1) ethylene-propylene terpolymer, butyl rubber, or a blend of ethylene-propylene terpolymer and butyl rubber, (2) a vulcanizing agent, (3) a vulcanization accelerator, (4) an adhesive agent, and (5) a softening agent is placed between overlapped areas of the waterproof vulcanized synthetic rubber sheets, and said adhesive tape is cold-vulcanized to thereby join the sheets.

6 Claims, 8 Drawing Figures

METHOD OF JOINING WATERPROOF VULCANIZED SYNTHETIC RUBBER SHEETS

FIELD OF THE INVENTION

This invention relates to a method of joining waterproof vulcanized synthetic rubber sheets. More particularly, this invention relates to a method of joining waterproof vulcanized synthetic rubber sheets which can be used on the job site, e.g., in civil engineering for preventing water leakage from reservoirs, irrigation ponds, tanks for treating industrial wastes, irrigation channels, and other water courses, as well as for various community structures, such as indoor structures (e.g., lavatories and baths), roofs, subways, ditches, and overpasses. The method comprises joining such sheets by cold-vulcanizing a cold-vulcanizable adhesive tape between overlapped areas of the sheets, without the necessity of applying either heat or high pressure.

BACKGROUND OF THE INVENTION

Concrete and asphalt have been commonly used as lining materials for preventing water leakage from reservoirs, but recently, it is more common to use vulcanized rubber sheeting that withstands large deformations, has high weatherability, and which is flexible enough to absorb the subsequent movement of the lined area (e.g., river bed). But the nature of the process for manufacturing vulcanized rubber sheeting imposes dimensional limitations on the production equipment, and although sheeting as long as about 200 m can be made without great difficulty, its width is usually about 1.0 m, and making sheeting wider than 10 m is practically impossible. Therefore, the current practice is to transport vulcanized rubber sheets to the installation site, where they are then joined together.

Several methods have been proposed to make the overlapped areas of the joined sheets resistant against water leakage. The two most common methods are to use an adhesive agent, and to use an unvulcanized rubber tape. However, neither method is completely satisfactory. In the first method, bonding had a tendency to become uneven because a uniform film of the adhesive cannot easily be obtained. In addition, the adhesion strength varies greatly with the length of open time. The open time is alternatively called "open assembly time" and means the time which gives an appropriate tackiness to an adhesive by coating an adhesive to a material and allowing to stand the coated surface thereof to volatilize a solvent contained in the adhesive. The greater defect of this method is that no matter how good the quality of the vulcanized sheets and adhesive tape are, poor adhesion may result unless the persons applying the tape are very skilled. If a strong wind blows during open time, dust sticks on the surface and prevents strong adhesion. If the temperature is high, even a short open time will result in overdrying of the adhesive to cause poor adhesion. If the humidity is high, dew is formed on the joining surfaces, also causing poor adhesion. If the temperature is too low, a long open time reduces the joining efficiency. Thus, the sheet-joining workers must have adequate knowledge on the various environments under which the work may be executed. Therefore, with the first method, it is very difficult to join the waterproof vulcanized rubber sheets securely enough to ensure that there will be no water leaks.

An example of the second method that uses an unvulcanized rubber tape comprises sandwiching the unvulcanized rubber tape between vulcanized rubber sheets and spot-vulcanizing them by applying heat (150°–200° C.) and pressure (100–150 kg/cm$^2$) to both obverse and reverse sides of the sheets. But this method requires a vulcanizing press on the job site. In addition, the desired bond strength is not obtained unless high vulcanization temperature and pressure are used, and this results in prolonged joining time, and reduced joining efficiency.

The conventional unvulcanized rubber tape has Mooney viscosity [ML$_{1+5}$(100° C.)] of 23 and comprises the following compositions (parts by weight).

| | |
|---|---|
| EPT (third component: dicyclopentadiene, iodine value: 20) | 70 |
| IIR | 30 |
| ZnO | 5 |
| SRF carbon | 40 |
| Escoretz (product of Esso Chemical Co.) | 15 |
| Paraffinic process oil (product of Maruzen Oil Co.) | 20 |
| S | 1.5 |
| Dipentamethylenehexasulfide | 5.5 |

SUMMARY OF THE INVENTION

Therefore, one object of this invention is to provide an efficient method of joining waterproof vulcanized rubber sheets without a vulcanizing press.

Another object of this invention is to provide a method of joining waterproof vulcanized rubber sheets strongly enough by cold vulcanization to ensure security from water leaks.

A further object of this invention is to provide a method of joining waterproof vulcanized rubber sheets that can be used on a job site.

According to the method of this invention, a cold-vulcanizable adhesive tape having Mooney viscosity [ML$_{1+5}$(100° C.)] of from 5 to 25 and an autoadhesion property and containing (1) a rubbery polymer, (2) a vulcanizing agent, (3) a vulcanization accelerator, (4) an adhesive agent, and (5) a softening agent is placed between overlapped areas of waterproof vulcanized synthetic rubber sheets, and said adhesive tape is cold vulcanized to thereby join the sheets.

DETAILED DESCRIPTION OF THE INVENTION

Figure 1:
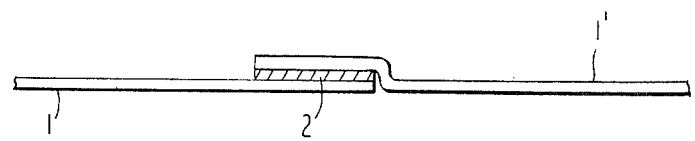
FIG. 1 is a cross sectional view of overlapped areas of waterproof sheets that are joined in one embodiment of the method of this invention.

Specific embodiments of the method of this invention are now described in detail by reference to the accompanying drawings. FIG. 1 is a cross sectional view of overlapped areas of waterproof sheets 1 and 1' joined according to one embodiment of this invention. In FIG. 1, a cold-vulcanizable adhesive tape (2) of the same width as the overlapped areas is sandwiched between these areas, and the overlapped areas of the waterproof sheets existing the adhesive tape are pressed with a roller or other suitable means for the purpose of increasing a self-adhesion between rubber sheets and also removing air present between rubber sheets. The pressure is from about 0.3 to 1 kg/cm.

The adhesive tape used in this invention can be placed between the overlapped areas of waterproof sheets by several techniques. Three useful techniques are described below.

(1) A pre-formed rubber compound (A) having a vulcanizing agent, an adhesive, a softening agent, etc., incorporated therein, and a pre-formed rubber compound (B) having incorporated therein a vulcanization accelerator, an adhesive, a softening agent, etc., are separately charged into a mixing extruder on the job site where they are mixed and extruded in the form of a tape, and the resulting adhesive tape is placed between the overlapped areas of the sheets. In this method, the adhesive agent or softening agent may be incorporated in either or both of rubber compounds (A) and (B).

(2) A pre-formed rubber compound (A) having a vulcanizing agent, an adhesive agent, and a softening agent incorporated therein, and a pre-formed rubber compound (B) having a vulcanization accelerator, an adhesive agent, and a softening agent incorporated therein are charged into a portable extruder, such as a portable applicator extruder on the job site, from which an adhesive tape is extruded directly between the overlapped areas of the sheets. In this technique, the adhesive agent or softening agent may be incorporated in either or both of rubber compounds (A) and (B).

(3) A pre-formed adhesive tape having incorporated therein a vulcanizing agent, a vulcanization accelerator, an adhesive agent, and a softening agent is placed between the overlapped areas of the sheets on the job site.

The first two techniques are suitable for making an adhesive tape which vulcanizes quickly. Due to the quick vulcanization, such a tape thus obtained has poor storage stability. On the other hand, the third technique is suitable for making an adhesive tape which vulcanizes slowly. Such a tape thus obtained has good storage stability.

The cold-vulcanizable adhesive tape used in this invention is preferably made of a weather-resistant material such as an ethylene-propylene terpolymer (EPT), butyl rubber (IIR) or a blend of EPT and IIR. The third component in the EPT is optional, but the preferred examples thereof are dicyclopentadiene (iodine value 20), ethylidene norbornene (iodine value 24), etc. The tape may contain suitable amounts of a vulcanizing agent, a vulcanization accelerator, an adhesive agent, and a softening agent, as well as other additives such as stearic acid, carbon black, inorganic filler, and ZnO.

Suitable examples of vulcanizing agents include sulfur or sulfur compounds, such as morpholine disulfide, phosphorus-containing polysulfide and sulfur chloride; oximes such as p-quinone dioxime and p,p'-dibenzoyl quinone dioxime; and peroxides such as $\alpha$-cumyl hydroperoxide, methyl ethyl ketone peroxide, hydrogen peroxide, acetylacetone peroxide, t-butyl hydroperoxide, and t-butyl peroxybenzoate. These vulcanizing agents are usually included in an amount of from 1 to 6 parts by weight per 100 parts by weight of the rubbery polymer.

Suitable examples of vulcanization accelerators include thiazoles such as 2-mercaptobenzothiazole and dibenzothiazyl disulfide; thiurams such as tetramethylthiuram monosulfide, tetramethylthiuram disulfide, and dipentamethylenethiuram hexasulfide; dithiocarbamates such as Zn-dimethyl dithiocarbamate, Zn-di-n-butyl dithiocarbamate; and $PbO_2$ and Trimene Base (trademark of Uniroyal Chem. for a reaction product of ethyl chloride, formaldehyde, and ammonia). These vulcanization accelerators are usually included in an amount of from 2 to 10 parts by weight per 100 parts by weight of the rubbery polymer.

Suitable examples of the adhesive agents include petroleum hydrocarbon resins, such as an aromatic hydrocarbon resin (e.g., Petrosin (trademark) of Mitsui Petrochemical Industries, Ltd.) and an alicyclic hydrocarbon resin (e.g., Hyretz (trademark) of Mitsui Petrochemical Industries, Ltd.); an unsaturated hydrocarbon polymer such as Escoretz (trademark) of Esso Chemical Co.; a hydrocarbon tackifier resin such as Tackace (trademark) of Mitsui Petrochemical Industries, Ltd.; and a phenolic resin, such as phenol-formaldehyde resin. These adhesive agents are usually used in an amount of from 30 to 100 parts by weight per 100 parts by weight of the rubbery polymer.

Any known softening agent may be used in combination with the adhesive agents mentioned above, and typical examples of the softening agent are process oil, polybutene, liquid paraffin, pine tar and other high-boiling petroleum compounds. These softening agents are usually used in an amount of from 30 to 150 parts by weight per 100 parts by weight of the rubbery polymer.

A cold-vulcanizable adhesive tape that vulcanizes in a relatively short time and can be prepared on the job site can be a blend composed, for example, of 100 parts by weight of the rubbery polymer, from 1 to 2 parts by weight of an oxime vulcanizing agent (e.g., p-quinone dioxime or p,p'-dibenzoyl quinone dioxime), from 3 to 4 parts by weight of a $PbO_2$ vulcanization accelerator, from 30 to 100 parts by weight of an adhesive agent, and from 30 to 150 parts by weight of a softening agent, such as process oil. A cold-vulcanizable adhesive tape that vulcanizes in a relatively long time and can be preformed in a factory can be a blend which is composed, for example, of 100 parts by weight of the rubbery polymer, from 1 to 3 parts of a vulcanizing agent selected from sulfur and sulfur-containing compounds such as morpholine disulfide, phosphorus-containing polysulfide and sulfur chloride, from 2 to 6 parts by weight of a vulcanization accelerator selected from among thiazoles, thiurams, and dithiocarbamates, from 30 to 100 parts by weight of an adhesive agent, and from 30 to 150 parts by weight of a softening agent such as process oil.

The cold-vulcanizable adhesive tape used in this invention can be vulcanized in air or water at ambient temperature, and it can be vulcanized on the job site without application of any heat or high pressure that has heretofore been necessary. In addition, waterproof vulcanized rubber sheets can be joined by this tape very strongly so that adequate prevention of water leakage can be achieved. This tape is required to provide a sheet joint with an initial strength of autoadhesion strength of at least about from 0.5 to 3 kg/25 mm, and without such strength, the overlapped areas of the joined sheets can deform or slip from place when the sheets are wrapped around something or stretched. Therefore, to provide the minimum amount of autoadhesion strength, typically from 30 to 100 parts of an adhesive agent and from 30 to 150 parts by weight of a softening agent are incorporated per 100 parts of the rubbery polymer so that the resulting adhesive tape has Mooney viscosity [$ML_{1+5}$ (100° C.)] in the range of from 5 to 25. If the adhesive tape has Mooney viscosity of this range, foreign particles such as dust or dirt that might adhere to the joined surfaces of waterproof sheets penetrate into the tape, and as a result, the adhesive strength between the joined sheets is not significantly affected.

The adhesive tape used in this invention desirably has a thickness between 0.5 and 2 mm. If the thickness of adhesive tape is thinner than 0.5 mm or thicker than 2.0 mm, the adhesive strength decreases.

The waterproof vulcanized synthetic rubber sheet used in the method of the present invention is preferably made of an excellent weather-resistant material such as an ethylene-propylene terpolymer (EPT), butyl rubber (IIR) or a blend of EPT and IIR.

After the adhesive tape is placed between the overlapped areas of waterproof sheets in the manner described below, the overlapped areas are pressed together with a roller or other suitable means. This is for the purposes of providing increased adhesive strength between the joined sheets and removing any air trapped between the two sheets. As a further advantage, reliable on the job site joining is achieved by the method of this invention, because the adhesive tape further vulcanizes in the course of time to provide an even stronger bonding of the two sheets. The adhesive tape is flexible and has a substantially uniform thickness, so upon application of pressure, it is brought into uniform and intimate contact with the overlapped areas of the waterproof sheets, thus assuring the desired protection from water leakage.

In the case wherein the overlapped areas of the waterproof sheets require an initial strength higher than 3 kg/25 mm, after the adhesive tape is placed between the overlapped areas of the waterproof sheets, the overlapped areas are put between two plane plates and then pressed and heated, or the overlapped areas are pressed and heated by hot plates placed on the upper surfaces of the overlapped areas. In this case, the conditions are pressure of from 10 g/cm² to 3 kg/cm², temperature of from 120° to 230° C. and press-heating time of from 1 to 5 minutes.

Thus, the adhesive tape present on the overlapped areas is semi-vulcanized and the adhesive strength between the waterproof sheets increases within a short period of time.

The adhesive tape is thereafter cold-vulcanized.

Figure 2:
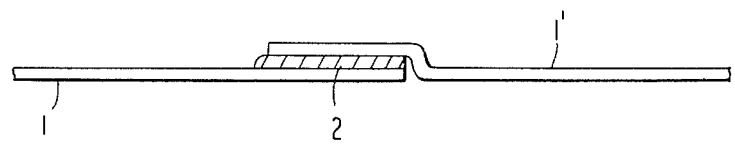
FIGS. 2 to 5 are cross sectional views of overlapped areas of waterproof sheets that are joined in other embodiments of the method of this invention.

FIG. 2 is a cross section of the overlapped areas of waterproof sheets 1, 1' that are joined in another embodiment of the method of this invention. In the figure, a cold-vulcanizable adhesive tape 2 of the same width as the overlapped areas is positioned between those areas in such a manner that one end of the tape extends from the overlapped end of the sheet 1'. The joined surfaces of the sheets are then pressed together by a roller or other suitable means. In the embodiment of FIG. 2, there is no great difference in level between the joined sheets 1, 1' because of the end of the tape exposed from the overlapped end of the sheet 1'. Consequently, the possibility of subsequent separation of the overlapped area of the sheet 1' is decreased while also better assuring security from the penetration of water.

Figure 3:
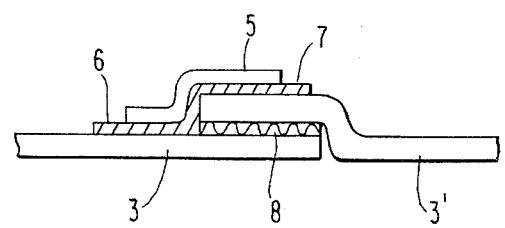
Figure 4:
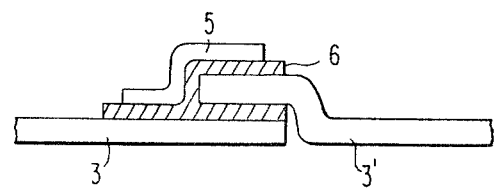
Figure 5:
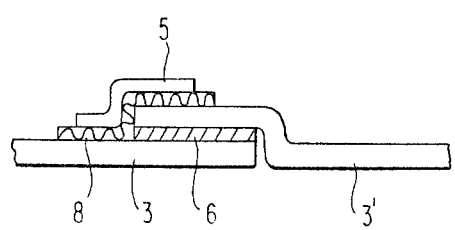

FIGS. 3, 4, and 5 are cross sectional views of overlapped areas of waterproof sheets 3 and 3' that are joined in still other embodiments of the method of this invention, wherein the adhesive tape is used for the purpose of providing greater initial adhesive strength between two sheets that are joined on the job site. In FIG. 3, the adhesive tape covers the overlapped area of the waterproof sheet 3'. More specifically, a vulcanized rubber tape 7 with an adhesive tape which comprises a vulcanized rubber layer 5 laminated with cold-vulcanizable adhesive tape 6 in such a manner that both ends of the tape 6 extend from the rubber layer 5 is attached to cover the overlapped area of the waterprooof sheet 3', with the adhesive tape 6 facing down. In the embodiment of FIG. 3, the overlapped areas of the sheets 3 and 3' are joined with an adhesive agent 8 as in the conventional manner. By so doing, adequate protection from water leakage can be achieved because no water will enter from the overlapped area of the sheet 3'. The arrangement of FIG. 3 also has the advantage of reinforcing the joined areas of waterproof sheets. Another advantage of the embodiment of FIG. 3, wherein the adhesive tape 6 is so wide that both of its ends extend exposed from the vulcanized rubber part 5, is that the force of cohesion between the polymer particles of the tape is increased while minimizing the expansion and shrinkage of the rubber part.

The embodiment of FIG. 4 is identical with that of FIG. 3, except that the adhesive tape 6 is also used between the waterproof sheets 3 and 3'. The embodiment of FIG. 5 is also identical with that of FIG. 3 except that the adhesive tape is placed between the waterproof sheets 3 and 3', and a vulcanized rubber tape composed of the vulcanized rubber layer 5 having a coating of adhesive agent 8 is placed on the sheets so as to cover the overlapped area of the sheet 3'. The embodiments of FIGS. 4 and 5 achieve the same result as that of the embodiment of FIG. 3.

The method of this invention is now described in greater detail by reference to the following examples which are given here for illustrative purposes only, and are not intended to limit the scope of the invention.

EXAMPLE 1

Equal weights of pre-formed rubber compounds (A) and (B) having the formulations indicated in Table 1 were charged into a conventional mixing extruder on a job site from which a cold-vulcanizable adhesive tape having a thickness of 1.0 to 1.5 mm, a width of 100 mm, and Mooney viscosity of 15 was extruded. The tape was positioned, as shown in FIG. 1, between 100 mm wide overlapped edges of two waterproof vulcanized rubber sheets 1.5 mm thick composed of an EPT/IIR blend, and the two sheets were pressed together with a roller at a linear pressure of 0.5 kg/cm.

TABLE 1

| Formulation of adhesive tape in parts by weight | | |
|---|---|---|
| | Compound (A) | Compound (B) |
| IIR | 35 | 35 |
| EPT | 15 | 15 |
| ZnO | — | 5 |
| Stearic acid | 0.5 | 0.5 |
| HAF carbon | 50 | — |
| Calcium carbonate | — | 50 |
| Olefinic resin (Escoretz, Esso Chemical Co.) | 30 | 30 |
| Paraffinic process oil (Maruzen Oil Co.) | 25 | 35 |
| GMF (p-quinone dioxime) | 1 | — |

TABLE 1-continued

| Formulation of adhesive tape in parts by weight | | |
|---|---|---|
| | Compound (A) | Compound (B) |
| PbO$_2$ | — | 3.5 |

Figure 6:
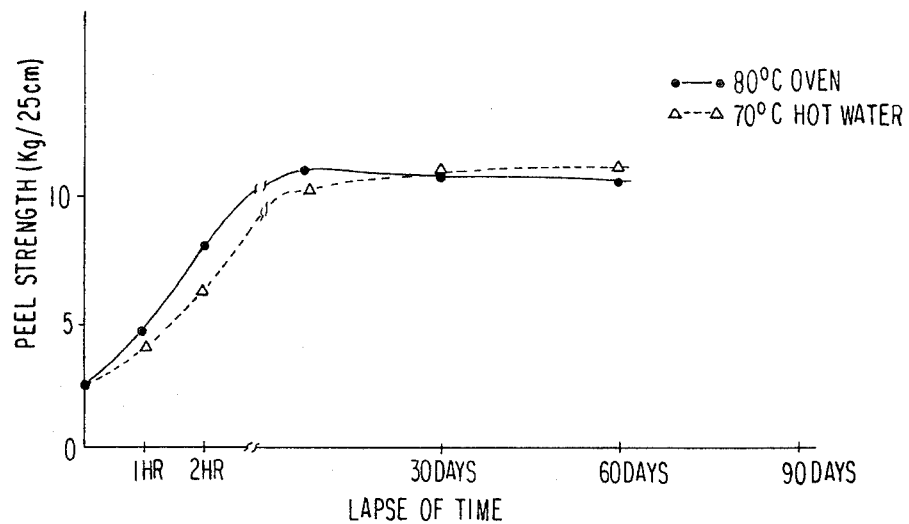
FIG. 6 is a graph showing the time-dependent change in the peel strength of joined waterproof sheets prepared according to Example 1 that were stored in either a Gear oven (Gear system ageing tester) at 80° C. or in hot water at 70° C.
Figure 7:
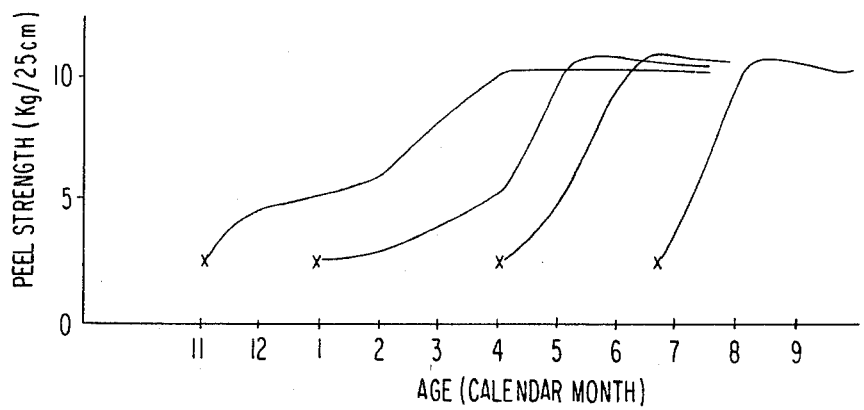
FIG. 7 is a graph showing the time-dependent change in the peel strength of the joined waterproof sheets of Example 1 that were subjected to weathering.

In summer, waterproof sheets in service may be heated by the direct sunshine and the temperature of their surface may become as high as 70°–80° C. Therefore, the time-dependent change in the peel strength of the sheets was checked by storing them in a Gear oven at 80° C. and in hot water at 70° C. The results are shown in FIG. 6. The sheets were also subjected to outdoor weathering for checking the time-dependent change in their peel strength. The results are shown in FIG. 7. The peel tests were conducted by the following procedure: 1×6 inch test pieces cut from the joined sheets were subjected to a T-peel with a tensile tester (20°–25° C., 50 mm/min).

Figure 8:
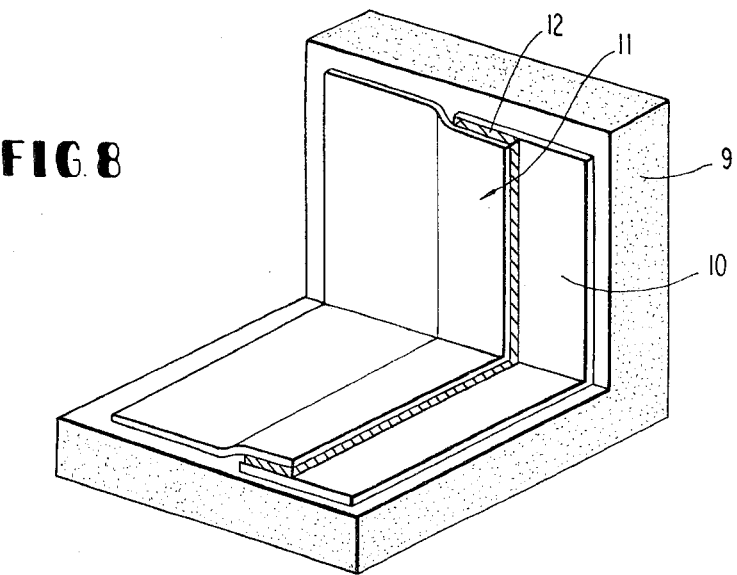
FIG. 8 is a perspective view of the joined waterproof sheets of Example 1 that were applied to a corner portion of another object.

The bond strength of the waterproof sheets at a corner was checked by the following procedure: waterproof sheets indicated at 10 in FIG. 8 were attached to a cornered mortar wall 9 with an adhesive tape 12 positioned between the overlapped areas 11 of the sheets, and the joined sheets were subjected to weathering to see if the sheets at the corner came apart. The results are shown in Table 2.

TABLE 2

| Weathering | Started in April | | | |
|---|---|---|---|---|
| Days | 7 | 15 | 30 | 60 |
| Separation | No | No | No | No |

EXAMPLE 2

A pre-formed cold-vulcanizable adhesive tape having a thickness of 1.0 to 1.5 mm, a width of 100 mm and Mooney viscosity of 15 which was prepared from a rubber compound of the composition indicated in Table 3 was stored for 2 days at 25° C. before it was brought to the job site. The tape was positioned as shown in FIG. 1 between 20-mm wide overlapped areas of two waterproof sheets of the same material as indicated in Example 1, and the sheets were pressed together with a roller at a linear pressure of 0.5 kg/cm. The joined sheets were stored in a Gear oven at 80° C. to check the time-dependent change in their peel strength. The results are shown in Table 4.

TABLE 3

| Composition of rubber compound in parts by weight | |
|---|---|
| EPT | 30 |
| IIR | 70 |
| ZnO | 5 |
| Paraffinic process oil (Maruzen Oil Co.) | 60 |
| Calcium carbonate | 20 |
| FEF carbon | 50 |
| Petroleum resin (Petrosin, Mitsui Petrochemical Ind.) | 60 |
| Sulfur | 2 |
| Dipentamethylenethiuram hexasulfide | 5 |

TABLE 4

| Peel strength (kg/25 mm) | |
|---|---|
| Age | Peel Strength |
| Immediately after joining | 1.25 |
| 2 hours later | 2.0 |
| 24 hours later | 9.5 |

TABLE 4-continued

| Peel strength (kg/25 mm) | |
|---|---|
| Age | Peel Strength |
| 7 days later | 10.3 |

EXAMPLE 3

Pre-formed rubber compounds (A) and (B) having the formulations indicated in Table 5 were charged into a portable applicator on the site from which a cold-vulcanizable adhesive tape having a width of 100 mm, a thickness of 1.0 mm, and Mooney viscosity of 8 was extruded continuously. The tape was sandwiched, as shown in FIG. 1, between the overlapped areas of two waterproof sheets of the same material as indicated in Example 1, and the sheets were pressed together with a roller at a linear pressure of 0.5 kg/cm. The joined sheets were stored in a Gear oven at 80° C. to check the time-dependent change in their peel strength. The results are shown in Table 6.

TABLE 5

| Formulation of adhesive tape (parts by weight) | | |
|---|---|---|
| | Compound (A) | Compound (B) |
| IIR | 50 | 50 |
| ZnO | 5 | — |
| Stearic acid | 0.5 | 0.5 |
| FEF carbon | 50 | — |
| Calcium carbonate | — | 40 |
| Petroleum resin | 30 | 30 |
| Paraffinic process oil | 35 | 25 |
| p-Quinone dioxime | 1 | — |
| PbO$_2$ | — | 3.5 |

TABLE 6

| Peel strength (kg/25 mm) | |
|---|---|
| Age | Peel Strength |
| Immediately after joining | 2.0 |
| 2 hours later | 9.8 |
| 24 hours later | 10.8 |
| 7 days later | 14.9 |

COMPARATIVE EXAMPLE

As shown in FIG. 1, a coating of a cold-vulcanizable butyl solvent adhesive having the compositions, parts by weight, of IIR 100 parts, TiO$_2$ 3.5 parts, SRF carbon 25 parts, Tackace (product of Mitsui Petrochemical Ind.) 30 parts, GMF 3.5 parts, PbO$_2$ 2.5 parts, toluene 422 parts and n-hexane 138 parts, was applied in a thickness of 0.4–0.5 mm between the 100-mm wide overlapped areas of waterproof sheets made of the vulcanized rubber identified in Example 1, and after an open time of 30 minutes the joined sheets were pressed together with a roller at a linear pressure of 0.5 kg/cm. The sheets were then stored in a Gear oven at 80° C. to check the time-dependent change in their peel strength. The results are shown in Table 7 together with those of Examples 1, 2 and 3. The joining efficiency of the method used in Comparative Example as compared with that of the method of this invention according to Example 1 is set forth in Table 8.

The joining work was done during a period in September and October when the outdoor average temperature was from about 16.9° to 23.0° C. As in the method of Example 1, the adhesive tape was positioned between the 100 mm wide overlapped areas of waterproof sheets.

TABLE 7

| Age | Peel strength (kg/25 mm) | | | |
|---|---|---|---|---|
| | Comparative Example | Example 1 | Example 2 | Example 3 |
| Immediately after joining | | 2.5 | 1.25 | 2.0 |
| 2 hours later | | 8.0 | 2.0 | 9.8 |
| 6 hours later | 2.0 | — | — | — |
| 24 hours later | 3.5 | 9.8 | 9.5 | 10.8 |
| 7 days later | 4.1 | 12.0 | 10.3 | 14.9 |

TABLE 8

| Method | Joining Efficiency |
|---|---|
| Comparative Example using adhesive | ca. 300 m/5 men-day (by 5 skilled workers) |
| Example 1 using adhesive tape | ca. 600 m/5 men-day (by 1 skilled worker and 4 unskilled workers) |

As is clear from the above examples, the joining method of this invention that uses a cold-vulcanizable adhesive tape and which does not require a vulcanizing press on the job site achieves an efficient joining operation. Since the adhesion strength of the rubber sheet immediately after joining is as good as that obtained by the conventional method that uses an adhesive, the overlapped areas of waterproof sheets will remain in place throughout the joining work. In addition, the adhesion strength increases over a period of time. As another advantage, the adhesive tape makes uniform and intimate contact with the overlapped areas of waterproof sheets, and so complete security from water leakage is assured.

While the invention has been described in detail and with reference to specific embodiments thereof, it will be apparent to one skilled in the art that various changes and modifications can be made therein without departing from the spirit and scope thereof.

What is claimed is:

1. A method for joining waterproof vulcanized synthetic rubber sheets wherein a cold-vulcanizable adhesive tape having a Mooney viscosity ($ML_{1+5}$ (100° C.)) of from 5 to 25 and an autoadhesion property, and which is prepared from a blend of (1) 100 parts by weight of a rubbery polymer, (2) from 1 to 2 parts by weight of an oxime vulcanizing agent or from 1 to 3 parts by weight of sulfur or a sulfur-containing vulcanizing agent, (3) from 3 to 4 parts by weight of a $PbO_2$ vulcanization accelerator in the case of using an oxime vulcanizing agent or from 2 to 6 parts by weight of a thiazole, thiuram, or dithiocarbamate vulcanization accelerator in the case of using a sulfur or sulfur-containing vulcanizing agent, (4) from 30 to 100 parts by weight of an adhesive agent, and (5) from 30 to 150 parts by weight of a softening agent, is placed between overlapped areas of waterproof vulcanized synthetic rubber sheets and pressed to provide an initial adhesive strength of from 0.5 to 3 kg/25 mm, and the adhesive tape is cold-vulcanized to join the sheets.

2. A method as in claim 1, wherein the vulcanizing agent is an oxime and the vulcanization accelerator is $PbO_2$.

3. A method as in claim 1, wherein the vulcanizing agent is selected from sulfur and sulfur-containing vulcanizing agents, and the vulcanization accelerator is selected from thiozoles, thiurams, and dithiocarbamates.

4. A method as in claim 1, 2, or 3, wherein the rubbery polymer comprises an ethylene-propylene terpolymer, butyl rubber, or a blend of an ethylene-propylene terpolymer and butyl rubber, and the cold-vulcanizable adhesive tape is prepared at the job site by charging components (1)-(5) into a mixing extruder from which a tape as wide as the overlapped areas of the waterproof sheets is extruded and placed between the overlapped areas of the waterproof sheets.

5. A method according to claim 1 or 2 wherein the vulcanizing agent is selected from p-quinone dioxime, and p,p'-dibenzoyl quinone dioxime.

6. A method according to claim 1 or 3 wherein the vulcanizing agent is selected from morpholine disulfide, phosphorus-containing polysulfide and sulfur chloride.

* * * * *